(12) United States Patent
Katou

(10) Patent No.: US 7,384,372 B2
(45) Date of Patent: Jun. 10, 2008

(54) PULLEY THRUST CONTROL DEVICE FOR CONTINUOUSLY VARIABLE TRANSMISSION

(75) Inventor: Yoshiaki Katou, Fujisawa (JP)

(73) Assignee: Jatco Ltd, Shizuoka (JP)

( * ) Notice: Subject to any disclaimer, the term of this patent is extended or adjusted under 35 U.S.C. 154(b) by 326 days.

(21) Appl. No.: 11/354,123

(22) Filed: Feb. 15, 2006

(65) Prior Publication Data
US 2006/0194671 A1    Aug. 31, 2006

(30) Foreign Application Priority Data
Feb. 28, 2005    (JP)    ............... 2005-053876

(51) Int. Cl.
*F16H 61/662*    (2006.01)
(52) U.S. Cl. .................................... 477/46
(58) Field of Classification Search ............. 477/44, 477/45, 46, 48, 115
See application file for complete search history.

(56) References Cited

U.S. PATENT DOCUMENTS 5,431,602 A * 7/1995 Hendriks et al. ............. 474/28
7,261,672 B2 * 8/2007 Frank et al. .................. 477/45
2004/0242370 A1* 12/2004 Iwatsuki et al. .............. 477/45
2006/0058129 A1* 3/2006 Kim et al. .................... 474/18

FOREIGN PATENT DOCUMENTS

JP    2000-018347 A    1/2000

* cited by examiner

*Primary Examiner*—Roger Pang
(74) *Attorney, Agent, or Firm*—Foley & Lardner LLP

(57) ABSTRACT

A control device for a belt continuously variable transmission with a primary pulley, a secondary pulley and a V-belt, includes an oil pressure control unit which applies a thrust to each of the primary pulley and the secondary pulley, and a controller. The controller judges whether or not a pulley ratio is less than 1. When the pulley ratio is less than 1, the controller sets a target thrust of the secondary pulley on the basis of an input torque to the primary pulley and a coefficient of static friction between an element forming the V-belt and the secondary pulley, and then to instruct the oil pressure control unit to apply the target thrust to the secondary pulley. When the pulley ratio is at least 1, the controller sets a target thrust of the primary pulley on the basis of the input torque to the primary pulley and a coefficient of dynamic friction between the element forming the V-belt and the primary pulley, and then to instruct the oil pressure control unit to apply the target thrust to the primary pulley.

10 Claims, 4 Drawing Sheets

PULLEY THRUST CONTROL DEVICE FOR CONTINUOUSLY VARIABLE TRANSMISSION

FIELD OF THE INVENTION

This invention relates to a pulley thrust control device for a V-belt continuously variable transmission (CVT).

BACKGROUND OF THE INVENTION

In a V-belt CVT which is mounted in a vehicle, a V-belt is held between a primary pulley and a secondary pulley, and motive power is transmitted by a contact frictional force between the V-belt and the pulleys. The groove widths of the primary pulley and the secondary pulley are controlled by means of oil pressure.

The control device for a continuously variable transmission which is disclosed in Japanese Patent Application Laid-Open No. 2000-18347, published in Japan in 2000, sets a pressure supplied to the primary pulley and a pressure supplied to the secondary pulley when the pulley ratio (i.e. speed reduction ratio) of the CVT is changed. The control device calculates a target secondary pulley pressure in accordance with a target pulley ratio and an input torque, and obtains a target primary pulley pressure in accordance with the calculated target secondary pulley pressure and a target shift speed. When the target primary pulley pressure is lower than or equal to a critical pressure of the V-belt slippage, the control device re-calculates the target secondary pulley pressure in accordance with the critical pressure of the V-belt slippage on the primary pulley. The target pulley ratio is achieved by this control, without generating slippage of the V-belt.

However, this conventional control device for a continuously variable transmission provides a predetermined margin when setting the target pulley pressure. For this reason, the target pulley pressure is needlessly set higher when the CVT is at high gear in which the target pulley pressure may be low. Here, high gear of the CVT means that a pulley ratio is less than 1, and low gear of the CVT means that the pulley ratio is higher than 1.

Proceedings No. 04 CVT-39 of CVT congress 2004 which is held in 2004 suggests changing the margin of the target pulley pressure in accordance with the pulley ratio. This eliminates setting the target pulley pressure high needlessly.

SUMMARY OF THE INVENTION

However, Proceedings No. 04 CVT-39 describes only that the target pulley pressure is determined in accordance with an input torque and pulley ratio, and does not consider a frictional coefficient between the V-belt element and the pulleys. Therefore, an error in setting the target pulley pressure is large, thus the load on a hydraulic pump is increased by the excess target pulley pressure, whereby lowering fuel economy.

Here, according to Society of Automotive Engineers, Paper 980822, it is known that the larger the slip velocity is, the smaller the frictional coefficient becomes, and that a coefficient of dynamic friction is smaller than a coefficient of static friction. Furthermore, it is known that the friction torque loss is present in the V-belt when the CVT is at high gear.

According to Proceedings of meeting of Society of Automatic Engineers of Japan, No. 9838372, the friction torque loss is proportional to the pulley pressure.

It is therefore an object of this invention to provide a pulley thrust control device for a V-belt continuously variable transmission, which can improve fuel economy.

In order to achieve the above object, this invention provides a control device for a belt continuously variable transmission, the belt continuously variable transmission having a primary pulley on an input side in which a groove width varies in accordance with an oil pressure; a secondary pulley on an output side in which the groove width varies in accordance with an oil pressure; and a V-belt which is wrapped around the primary pulley and the secondary pulley. The control device comprises a controller and an oil pressure control unit which applies a thrust to each of the primary pulley and the secondary pulley. The controller is programmed to judge whether or not a pulley ratio of the belt continuously variable transmission is less than 1; when the pulley ratio is less than 1, set a target thrust of the secondary pulley on the basis of an input torque to the primary pulley and a coefficient of static friction between an element forming the V-belt and the secondary pulley and subsequently instruct the oil pressure control unit to apply the target thrust of the secondary pulley to the secondary pulley; and when the pulley ratio is at least 1, set a target thrust of the primary pulley on the basis of the input torque to the primary pulley and a coefficient of dynamic friction between the element forming the V-belt and the primary pulley and subsequently instruct the oil pressure control unit to apply the target thrust of the primary pulley to the primary pulley.

This invention further provides a control method for controlling the belt continuously variable transmission. The control method comprises judging whether or not a pulley ratio of the belt continuously variable transmission is less than 1. The control method further comprises setting a target thrust of the secondary pulley on the basis of an input torque to the primary pulley and a coefficient of static friction between an element forming the V-belt and the secondary pulley and subsequently instructing an oil pressure control unit to apply the target thrust of the secondary pulley to the secondary pulley, when the pulley ratio is less than 1; and setting a target thrust of the primary pulley on the basis of the input torque to the primary pulley and a coefficient of dynamic friction between the element forming the V-belt and the primary pulley and subsequently instructing an oil pressure control unit to apply the target thrust of the primary pulley to the primary pulley, when the pulley ratio is at least 1.

The details as well as other features and advantages of this invention are set forth in the remainder of the specification and are shown in the accompanying drawings.

THE PREFERRED EMBODIMENTS OF THE INVENTION

Figure 1:
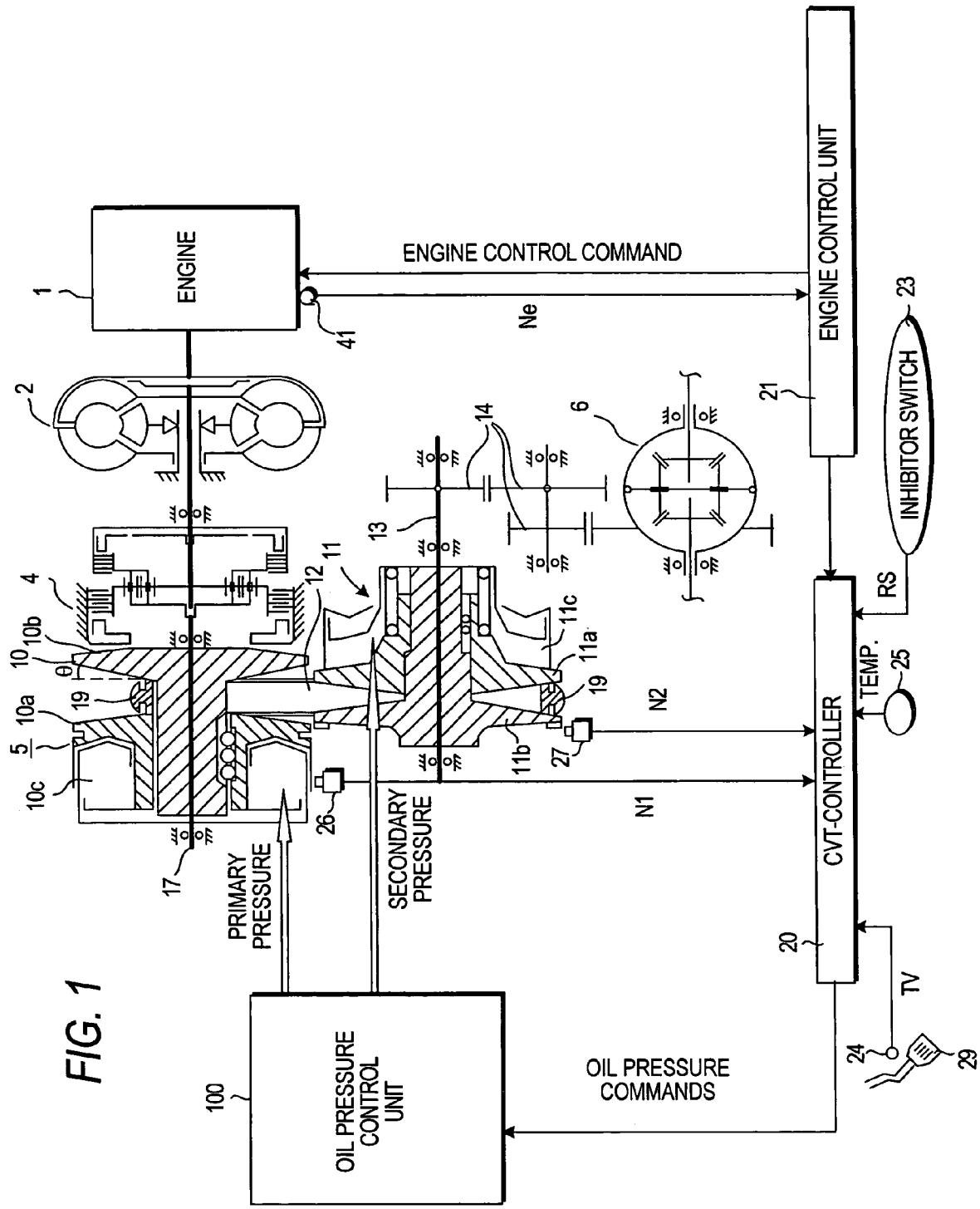
FIG. 1 is a schematic diagram of a V-belt continuously variable transmission.

Referring to FIG. 1, a continuously variable transmission (CVT) 5 is connected to an engine 1 via a torque converter 2 having a lockup clutch, and a forward/reverse change-over mechanism 4. In this embodiment, the CVT 5 is mounted in a vehicle. The continuously variable transmission 5 comprises, as a pair of variable pulleys, a primary pulley 10

(drive pulley) on an input shaft side and a secondary pulley 11 (driven pulley) connected to an output shaft 13. The primary pulley 10 and the secondary pulley 11 are connected to each other by a V-belt 12. The output shaft 13 is connected to a differential 6 via an idler gear 14 and an idler shaft 15. The forward/reverse change-over mechanism 4 including a planetary gear set switches the moving direction of the vehicle (i.e. rotational direction of the pulleys).

An oil pressure control unit 100 controls a pulley ratio (i.e. speed reduction ratio) of the continuously variable transmission 5 and a contact frictional force of the V-belt 12 in response to a commend sent from a CVT controller 20. In other words, the oil pressure control unit 100 controls the groove widths of the primary pulley 10 and the secondary pulley 11. The CVT controller 20 receives input torque information sent from an engine control unit 21 controlling the engine 1, and signals sent from sensors which is described hereinafter. The CVT controller 20 determines a target pulley ratio and a target contact frictional force (target pulley thrust) on the basis of the input torque information, the signals from the sensors and the like, and further controls the pulley ratio and the contact frictional force to the target pulley ratio and the target contact frictional force respectively via the oil pressure control unit 100. The CVT controller 20 and engine control unit 21 respectively comprises a microcomputer having a central processing unit (CPU), a read-only memory (ROM), a random access memory (RAM), and an input/output interface (I/O interface). The CVT controller 20 and engine control unit 21 may respectively comprise a plurality of microcomputers.

The primary pulley 10 of the continuously variable transmission 5 is configured with a fixed circular conic plate 10b which rotates with the input shaft 17 in an integrated fashion, and a movable circular conic plate 10a which is placed so as to be opposed to the fixed circular conic plate 10b and thereby forms a V-shaped pulley groove. The movable circular conic plate 10a can be displaced in an axial direction in accordance with an oil pressure (primary pressure) which acts on a primary pulley cylinder chamber 10c.

The secondary pulley 11 is configured with a fixed circular conic plate 11b which rotates with the output shaft 13 in an integrated fashion, and a movable circular conic plate 11a which is placed so as to be opposed to the fixed circular conic plate 11b and thereby forms a V-shaped pulley groove. The movable circular conic plate 11a can be displaced in an axial direction in accordance with an oil pressure (secondary pressure) which acts on a secondary pulley cylinder chamber 11c. The primary pulley cylinder chamber 10c and the secondary pulley cylinder chamber 11c respectively have an equal pressure receiving area Ao. The pressure receiving area Ao is an area for receiving pressure, or a cross sectional area of the cylinder.

A driving torque is input from the engine 1 to the continuously variable transmission 5 via the torque converter 2 and the forward/reverse change-over mechanism 4, and is further transmitted to the secondary pulley 11 from the primary pulley 10 via the V-belt 12. Displacing the movable circular conic plate 10a of the primary pulley 10 and the movable circular conic plate 11a of the secondary pulley 11 in the axial direction changes a respective contact radius of the primary and secondary pulleys 10, 11 with the V-belt 12. Accordingly, the pulley ratio between the primary pulley 10 and the secondary pulley 11 can be continuously varied. The oil pressure control unit 100 controls the pulley ratio of the continuously variable transmission 5 and the contact frictional force of the V-belt 12.

Figure 2:
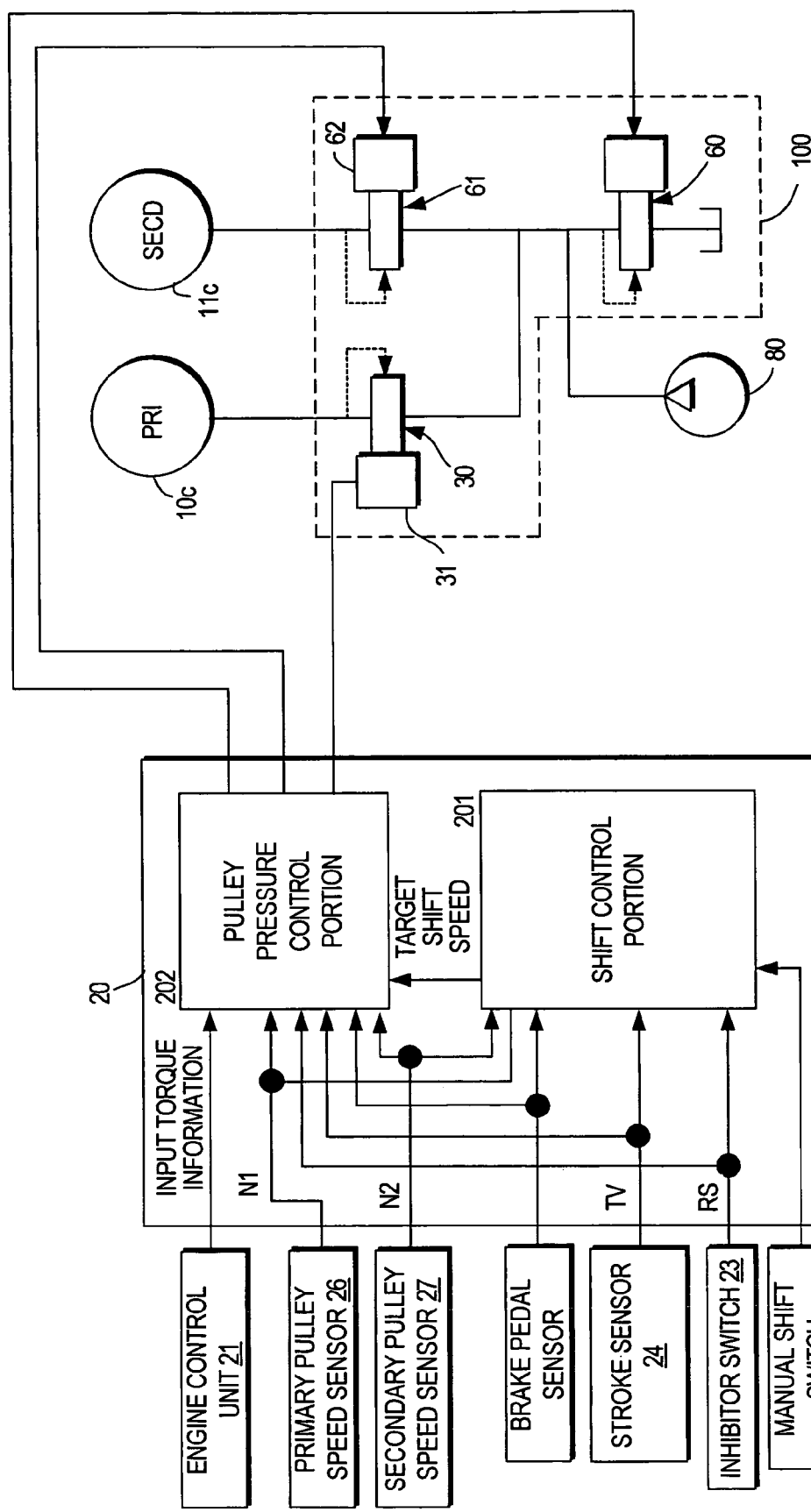
FIG. 2 is a schematic diagram of a CVT controller and an oil pressure control unit.

Referring to FIG. 2, the oil pressure control unit 100 comprises a regulator valve 60 which controls line pressure, a pressure reducing valve 30 which controls oil pressure of the primary pulley cylinder chamber 10c ("primary pulley pressure," hereinafter), and a pressure reducing valve 61 which controls supply pressure of the secondary pulley cylinder chamber 11c ("secondary pulley pressure," hereinafter).

A line pressure control system is configured with the regulator valve 60 which has a solenoid for adjusting oil pressure from a hydraulic pump 80, and generates a predetermined line pressure PL corresponding to an operational state of the vehicle, in response to a command of the CVT controller 20 (for example, a duty signal or the like).

The line pressure PL is supplied to the pressure reducing valve 30 having a solenoid 31 for controlling the primary pressure, and to the pressure reducing valve 61 having a solenoid 62 for controlling the secondary pressure.

A pulley ratio Ip between the primary pulley 10 and the secondary pulley 11 is controlled by the pressure reducing valves 30, 61 which are driven in response to a pulley ratio change command signal sent from the CVT controller 20. The line pressure PL is adjusted to the primary pressure by the pressure reducing valve 30 and supplied to the primary pulley 10, and the line pressure PL is adjusted to the secondary pressure by the pressure reducing valve 61 and supplied to the secondary pulley 11. The groove widths are variably controlled, whereby a predetermined pulley ratio is achieved. The pulley ratio Ip is defined by dividing a rotation speed N1 of the primary pulley 10 by a rotation speed N2 of the secondary pulley 11 (Ip=N1/N2). On the other hand, the gear ratio is a value obtained by multiplying the pulley ratio by a gear ratio of the idler gear 14 or the final speed reduction ratio of the differential gear.

In FIG. 1, a primary pulley speed sensor 26 detects the rotation speed N1 of the primary pulley 10 of the continuously variable transmission 5. A secondary pulley speed sensor 27 detects the rotation speed N2 (or vehicle speed) of the secondary pulley 11. An inhibitor switch 23 detects a position or range RS of the shift lever. A stroke sensor 24 detects a stroke amount TV (or the opening of a throttle valve) of the accelerator pedal 29 which is operated by a driver. An oil temperature sensor 25 detects an oil temperature of the continuously variable transmission 5. An engine rotation speed sensor 41 detects an engine rotation speed Ne. The CVT controller 20 receives signals from the primary pulley speed sensor 26, secondary pulley speed sensor 27, inhibitor switch 23, stroke sensor 24, and oil temperature sensor 25 respectively. Moreover, the CVT controller 20 receives a signal from the engine rotation speed sensor 41 directly or via the engine control unit 21. The CVT controller 20 controls the pulley ratio and the contact frictional force (pulley thrust) of the V-belt 12 on the basis of the rotation speed N1 of the primary pulley 10, the rotation speed N2 of the secondary pulley 11, the shift lever position, the stroke amount, and the oil temperature etc.

The CVT controller 20 comprises a shift control portion 201 and a pulley pressure (oil pressure) control portion 202. The shift control portion 201 and the pulley pressure control portion 202 may represent a function of one microcomputer, or may respectively be a microcomputer. The shift control portion 201 determines a target pulley ratio or a target shift speed in accordance with the rotation speed of the primary pulley, the rotation speed (vehicle speed) of the secondary pulley, and an operational state of the vehicle (for example, the stroke of the accelerator pedal, the presence of the operation of the brake pedal, the range of the shift lever, switching of a shift switch in the manual mode of the transmission, or the like), and controls an actual pulley ratio to the target pulley ratio. A brake pedal sensor detects the operation of the brake pedal. The pulley pressure (oil pressure) control portion 202 controls pulley thrusts (contact frictional force) of the primary pulley 10 and the secondary pulley 11 in accordance with an input torque inputted to the primary pulley 10, pulley ratio, shift speed, operational state of the brake pedal, stroke amount of the accelerator pedal, the range of the shift lever, or the like.

The pulley pressure control portion 202 determines a target value for the line pressure in accordance with input torque information such as engine torque, the pulley ratio Ip between the primary pulley rotation speed and the secondary pulley rotation speed, a state in which the brake pedal is pressed, the stroke amount of the accelerator pedal 29, or the shift range, and then controls the line pressure to the target value by driving the solenoid of the regulator valve 60. The pulley pressure control portion 202 determines target pressures for the primary pressure and the secondary pressure, drives the solenoids 31, 62 of the pressure reducing valves 30, 61 in accordance with the target pressures, and controls the primary pulley pressure and the secondary pulley pressure separately.

Calculation of target pulley thrusts or target pressures of the primary pulley 10 and secondary pulley 11, which is performed by the CVT controller 20, is explained next.

Pulley target thrust calculation according to this invention is characterized in considering a frictional coefficient $\mu$ between the V-belt element and a pulley and a friction loss torque $\Delta T$ of the CVT. The friction loss torque $\Delta T$ is a torque which is lost due to friction.

According to Society of Automotive Engineers, p. 31 of Paper 980822, the frictional coefficient $\mu$ between the element and the pulley tends to become small as the slip velocity becomes large. Specifically, a coefficient of dynamic friction $\mu d$ is smaller than a coefficient of static friction $\mu s$.

In the case in which the CVT is at high gear (the pulley ratio Ip is smaller than 1), although a pitch radius (i.e. contact radius) of the secondary pulley 11 becomes smaller than that of the primary pulley 10, micro slip does not occur between the secondary pulley 11 and the element 19. Here, the pitch radius is defined as a distance between the center of rotation of the pulley and a reference point (for example, mid point) of a contact portion (flank portion) in which the element 19 of the V-belt makes contact with the pulley.

Therefore, in the case in which the CVT is at high gear, the pulley target thrust of the secondary pulley 11 is set by means of the coefficient of static friction $\mu s$ which is larger than the coefficient of dynamic friction $\mu d$. Specifically, the pulley target thrust Fzs is calculated by Equation (1).

$$Fzs = Fp \times \cos(\theta) \times Sf/(2 \times \mu s) \qquad (1)$$

Here, Fzs is the secondary pulley target thrust, Fp is a force which is input to the primary pulley (force transmitted from the primary pulley to the V-belt), $\theta$ is a semi-vertical angle of the pulley (shown in FIG. 1), Sf is a safety factor, $\mu s$ is the coefficient of static friction between the belt element and the secondary pulley. It should be noted that Fp which is input to the primary pulley is a value obtained by dividing a primary input torque Tp by the pitch radius Rp of the primary pulley 10. The pitch radius Rp may be obtained on the basis of the pulley ratio. The primary input torque Tp, which is inputted to the primary pulley 10, is obtained by subtracting an engine inertial torque from an engine torque Te. The engine inertia torque is obtained by multiplying a time derivative of the rotation speed Ne of the engine by an inertia moment of the engine. The semi-vertical angle of the pulley $\theta$ is an angle which is half of an angle formed between the fixed circular conic plate and the movable circular conic plate which face to each other. The values of $\theta$, Sf, and $\mu s$ may be stored in the ROM. The CVT controller 20 calculates a target secondary pressure acting on the secondary pulley by dividing the pulley target thrust of the secondary pulley 11 by the pressure receiving area Ao of the secondary pulley cylinder chamber 11c, and further instructs the oil pressure control unit 100 to achieve the target secondary pressure.

Therefore, in the case in which the CVT is at high gear (the pulley ratio Ip is smaller than 1), by means of the coefficient of static friction $\mu s$, the pulley target thrust of the secondary pulley 11 can be set smaller than the thrust which is calculated by means of the coefficient of dynamic friction $\mu d$. As a result, required pulley pressure is reduced, and the load on the hydraulic pump 80 can be reduced, whereby fuel economy can be improved.

On the other hand, in the case in which the CVT is at low gear (the pulley ratio Ip is larger than 1), the pitch radius of the primary pulley 10 becomes smaller than that of the secondary pulley 11, and micro slip occurs between the primary pulley 10 and the element 19, thus a target pulley thrust of the primary pulley 10 is calculated by Equation (2) by means of the coefficient of dynamic friction $\mu d$.

$$Fzp = Fp \times \cos(\theta) \times Sf/(2 \times \mu d) \qquad (2)$$

Here, Fzp is the primary pulley target thrust, and $\mu d$ is the coefficient of dynamic friction between the belt element and the primary pulley. The value of $\mu d$ may be stored in the ROM.

In the case in which the CVT operates at low gear, the input torque from the engine becomes large, whereby the torque fluctuation becomes large. For this reason, when calculating the pulley target thrust, the coefficient of dynamic friction $\mu d$ is used to keep large clearance in the pulley thrust.

The CVT controller 20 calculates a target primary pressure acting on the primary pulley by dividing the pulley target thrust of the primary pulley 10 by the pressure receiving area Ao of the primary pulley cylinder chamber 10c, and further instructs the oil pressure control unit 100 to achieve the target primary pressure.

The friction loss torque $\Delta T$ of the CVT is explained next.

According to Society o Automatic Engineers, p. 31 of Paper 980822, and Proceedings of meeting of Society of Automatic Engineers of Japan, No. 9838372, it is known that the friction loss torque $\Delta T$ is present when the CVT operates at high gear. Therefore, when calculating the pulley target thrust, this friction loss torque is subtracted from the primary input torque in advance. Accordingly, this leads to reduction of the actual pulley thrust, whereby fuel economy can be improved.

To explain the calculation processing specifically, Fp, which is input to the primary pulley, can be calculated by Equation (3).

$$Fp = Tp/Rp \qquad (3)$$

Therefore, the pulley target thrust of the secondary pulley 11 can be expressed as shown in Equation (4).

$$Fzs = ((Tp - \Delta T)/Rp) \times \cos(\theta) \times Sf/(2 \times \mu s) \qquad (4)$$

The pulley target thrust becomes pulley thrust obtained by subtracting the friction loss torque ΔT, and the pulley target thrust can be constrained. Accordingly, required pulley pressure can be suppressed, resulting in improving fuel economy without causing slippage of the V-belt.

Figure 3A:
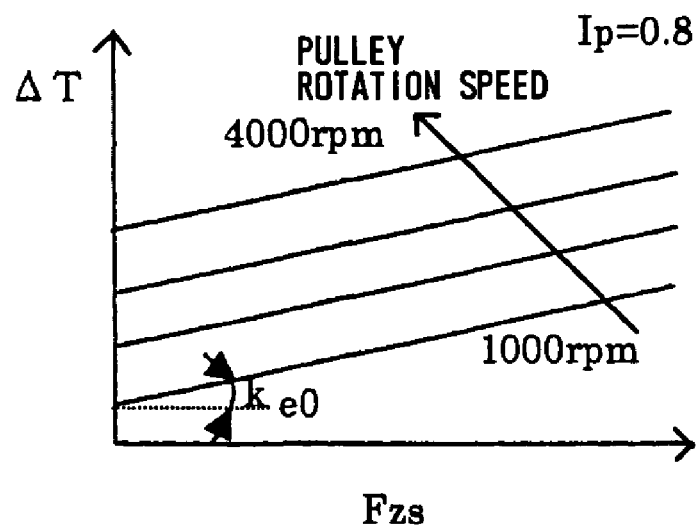
FIGS. 3A and 3B are graphs showing an example of a map which provides a friction loss torque as a function of a pulley thrust.
Figure 3B:
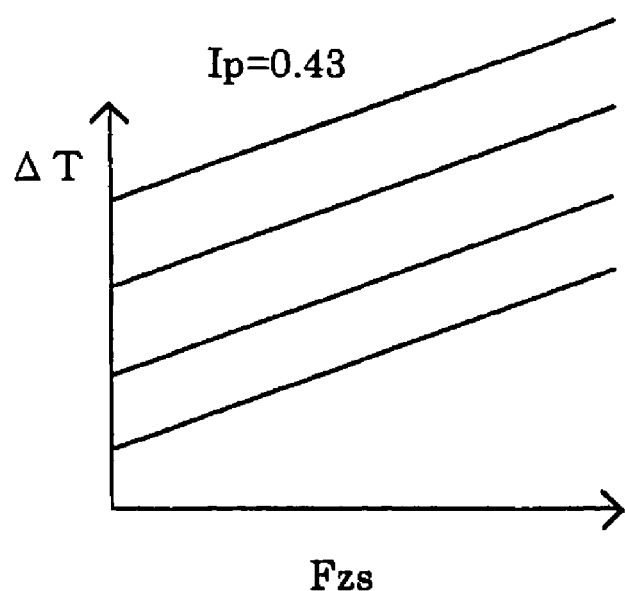

Further, as shown in FIGS. 3A and 3B, the friction loss torque ΔT is proportional to the pulley thrust. Therefore, in the case in which the CVT operates at high gear, the friction loss torque ΔT is proportional to the pulley thrust of the secondary pulley 11 (specifically, ΔT=k×Fzs+e0), and the pulley target thrust of the secondary pulley 11 can be expressed as shown in Equation (5) according to Equation (4).

$$Fzs=(Tp-e0)\times\cos(\theta)\times Sf/(2\times\mu s\times Rp+k\times Sf\times\cos(\theta)) \quad (5)$$

Here, k is a proportionality constant of the friction loss torque ΔT, and e0 is a constant representing a constant portion of the friction loss torque (a portion which is not proportional to the pulley thrust). The values of k and e0 may be stored in the ROM of the CVT controller 20.

Thus, an optimum pulley thrust Fzs can be set by considering that the friction loss torque ΔT of the V-belt is proportional to the pulley thrust.

Moreover, as shown in FIGS. 3A and 3B, the friction loss torque ΔT varies in accordance with the rotation speeds of the pulleys and the pulley ratio Ip, thus, in calculation of the pulley target thrust Fzs, the proportionality constant k and the constant portion of the friction loss torque e0 which are set may respectively be a function of the rotation speed N1, N2 of the primary pulley 10 or secondary pulley 11 and the pulley ratio Ip. Accordingly, the pulley target thrust can be set with higher accuracy, and further improvement of fuel economy can be achieved. Such functions described above may be stored in the ROM of the CVT controller 20 as a part of a calculation program for the pulley target thrust Fzs.

Figure 4:
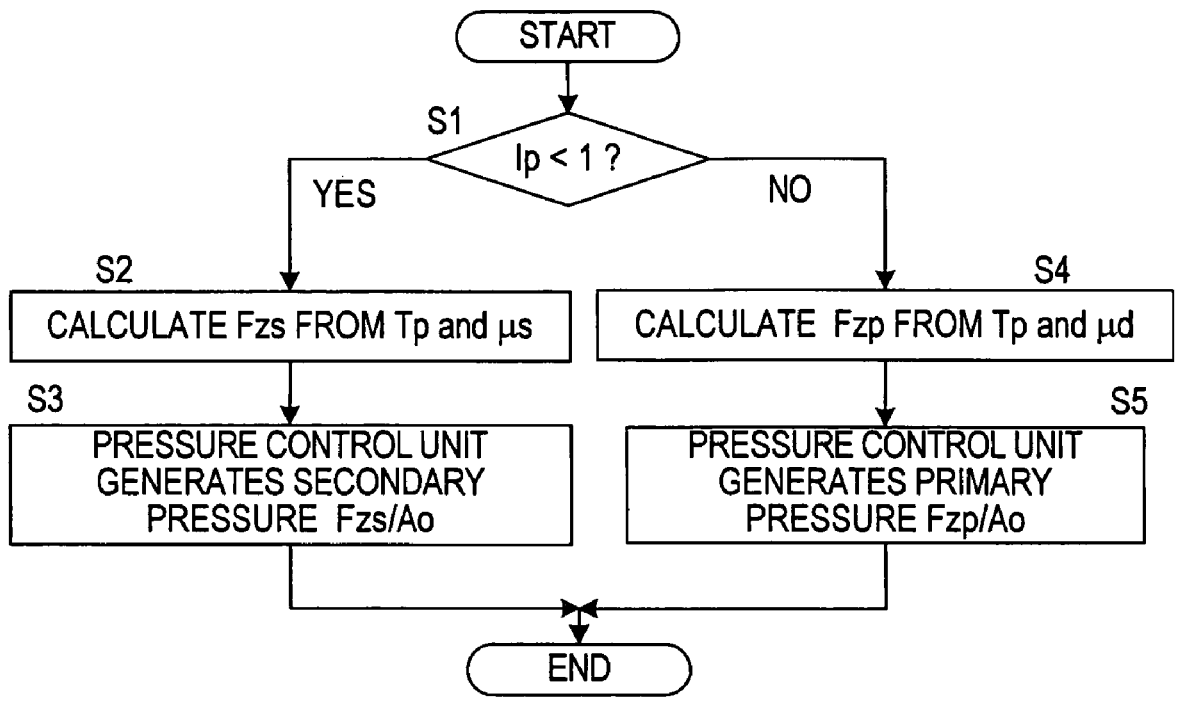
FIG. 4 is a routine of setting a primary pressure and a secondary pressure, the routine being executed by the CVT controller.

An example of a routine of setting the primary pressure and the secondary pressure is explained with reference to FIG. 4, the routine being executed by the CVT controller.

In Step S1, it is judged whether the present pulley ratio Ip is smaller than 1. The present pulley ratio Ip may be a present target pulley ratio which is set by means of a shift map in accordance with the state parameters of the vehicle (for example, stroke amount of the accelerator pedal and the vehicle speed (rotation speed of the secondary pulley 11)). This method of setting the target pulley ratio Ip is well known. Further, the present pulley ratio Ip may be an actual pulley ratio obtained as a value which is obtained by dividing the rotation speed of the primary pulley 10 by the rotation speed of the secondary pulley 11. When the pulley ratio Ip is smaller than 1, the routine proceeds to Step S2 where the pulley target thrust Fzs of the secondary pulley 11 is calculated by Equation (1), Equation (4), or Equation (5). Next, in Step S3 the oil pressure control unit 100 is instructed to generate the secondary pressure Fzs/Ao.

When the target pulley ratio Ip is equal to or larger than 1, the routine proceeds to Step S4 where the pulley target thrust Fzp of the primary pulley 10 is calculated by Equation (2). Next, in Step S5 the oil pressure control unit 100 is instructed to generate the primary pressure Fzp/Ao.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2005-53876(filed Feb. 28, 2005) are incorporated herein by reference.

What is claimed is:

1. A control device for a belt continuously variable transmission, the belt continuously variable transmission having a primary pulley on an input side in which a groove width varies in accordance with an oil pressure; a secondary pulley on an output side in which the groove width varies in accordance with an oil pressure; and a V-belt which is wrapped around the primary pulley and the secondary pulley;

the control device comprising:
an oil pressure control unit which applies a thrust to each of the primary pulley and the secondary pulley, and
a controller which is programmed to:
judge whether or not a pulley ratio of the belt continuously variable transmission is less than 1;
when the pulley ratio is less than 1, set a target thrust of the secondary pulley on the basis of an input torque to the primary pulley and a coefficient of static friction between an element forming the V-belt and the secondary pulley, and subsequently instruct the oil pressure control unit to apply the target thrust of the secondary pulley to the secondary pulley; and
when the pulley ratio is at least 1, set a target thrust of the primary pulley on the basis of the input torque to the primary pulley and a coefficient of dynamic friction between the element forming the V-belt and the primary pulley, and subsequently instruct the oil pressure control unit to apply the target thrust of the primary pulley to the primary pulley.

2. The control device as defined in claim 1, further comprising means for detecting the input torque to the primary pulley Tp,
wherein the controller is programmed to:
calculate a pitch radius Rp of the primary pulley on the basis of the pulley ratio; and
set the target thrust Fzs of the secondary pulley by the following equation, when the pulley ratio is less than 1: $Fzs=Fp\times\cos(\theta)\times Sf/(2\times\mu s)$
where Fp is a force which is transmitted from the primary pulley to the V-belt, θ is a semi-vertical angle of the pulley, Sf is a safety factor, μs is the coefficient of static friction between the element and the secondary pulley, and Fp is a value obtained by dividing the input torque Tp to the primary pulley by the pitch radius Rp of the primary pulley.

3. The control device as defined in claim 1, further comprising means for detecting the input torque to the primary pulley Tp,
wherein the controller is programmed to:
calculate a pitch radius Rp of the primary pulley on the basis of the pulley ratio; and
set the target thrust Fzs of the secondary pulley by the following equation: $Fzs=((Tp-\Delta T)/Rp)\times\cos(\theta)\times Sf/(2\times\mu s)$
where Fp is a force which is transmitted from the primary pulley to the V-belt, θ is a semi-vertical angle of the pulley, Sf is a safety factor, μs is the coefficient of static friction between the element and the secondary pulley, ΔT is a friction loss torque of the continuously variable transmission, and Fp is a value obtained by dividing the input torque Tp to the primary pulley by the pitch radius Rp of the primary pulley.

4. The control device as defined in claim 3, wherein the controller is further programmed to set the target thrust of the secondary pulley Fzs by the following equation: $Fzs = (Tp-e0) \times \cos(\theta) \times Sf/(2 \times \mu s \times Rp + k \times Sf \times \cos(\theta))$ where k is a proportionality constant of the friction loss torque $\Delta T$ with respect to the thrust of the secondary pulley, and e0 is a portion of the friction loss torque which is not proportional to the pulley thrust.

5. The control device as defined in claim 4, wherein the proportionality constant k and constant portion e0 of the friction loss torque $\Delta T$ are respectively a function of a rotation speed of the primary pulley or the secondary pulley and the pulley ratio.

6. The control device as defined in claim 1, further comprising means for detecting the input torque to the primary pulley Tp, wherein the controller is programmed to:
calculate a pitch radius Rp of the primary pulley on the basis of the pulley ratio; and
set the target thrust of the primary pulley Fzp by the following equation, when the pulley ratio is at least 1: $Fzp = Fp \times \cos(\theta) \times Sf/(2 \times \mu d)$ where Fp is a force which is transmitted from the primary pulley to the V-belt, $\theta$ is a semi-vertical angle of the pulley, Sf is a safety factor, $\mu d$ is the coefficient of dynamic friction between the element and the primary pulley, and Fp is a value obtained by dividing the input torque Tp to the primary pulley by the pitch radius Rp of the primary pulley.

7. The control device as defined in claim 1, further comprising:
a sensor which detects a rotation speed of the primary pulley; and
a sensor which detects a rotation speed of the secondary pulley, wherein the controller calculates the pulley ratio as a value obtained by dividing the rotation speed of the primary pulley by the rotation speed of the secondary pulley.

8. The control device as defined in claim 1, wherein the continuously variable transmission is mounted in a vehicle,
the control device comprises a sensor which detects a state of the vehicle,
the pulley ratio is a target pulley ratio which is set by the controller in accordance with the state of the vehicle.

9. A control device for a belt continuously variable transmission, the belt continuously variable transmission having a primary pulley on an input side in which a groove width varies in accordance with an oil pressure; a secondary pulley on an output side in which the groove width varies in accordance with an oil pressure; and a V-belt which is wrapped around the primary pulley and the secondary pulley;

the control device comprising:
oil pressure control means for applying a thrust to each of the primary pulley and the secondary pulley;
judging means for judging whether or not a pulley ratio of the belt continuously variable transmission is less than 1;
first setting means for setting, when the pulley ratio is less than 1, a target thrust of the secondary pulley on the basis of an input torque to the primary pulley and a coefficient of static friction between an element forming the V-belt and the secondary pulley;
instructing means for instructing the oil pressure control means to apply the target thrust of the secondary pulley to the secondary pulley;
second setting means for setting, when the pulley ratio is at least 1, a target thrust of the primary pulley on the basis of the input torque to the primary pulley and a coefficient of dynamic friction between the element forming the V-belt and the primary pulley; and
instructing means for instructing the oil pressure control means to apply the target thrust of the primary pulley to the primary pulley.

10. A control method for controlling a belt continuously variable transmission, the belt continuously variable transmission having a primary pulley on an input side in which a groove width varies in accordance with an oil pressure; a secondary pulley on an output side in which the groove width varies in accordance with an oil pressure; and a V-belt which is wrapped around the primary pulley and the secondary pulley;

the control method comprising:
judging whether or not a pulley ratio of the belt continuously variable transmission is less than 1;
setting a target thrust of the secondary pulley on the basis of an input torque to the primary pulley and a coefficient of static friction between an element forming the V-belt and the secondary pulley and subsequently instructing an oil pressure control unit to apply the target thrust of the secondary pulley to the secondary pulley, when the pulley ratio is less than 1; and
setting a target thrust of the primary pulley on the basis of the input torque to the primary pulley and a coefficient of dynamic friction between the element forming the V-belt and the primary pulley and subsequently instructing an oil pressure control unit to apply the target thrust of the primary pulley to the primary pulley, when the pulley ratio is at least 1.

* * * * *